(12) United States Patent
Signorino et al.

(10) Patent No.: US 10,655,863 B1
(45) Date of Patent: May 19, 2020

(54) LUMINAIRE FOR DOMESTIC ELECTRIC APPLIANCE, SUCH AS A DOMESTIC OVEN

(71) Applicant: emz-Hanauer GmbH & Co. KGaA, Nabburg (DE)

(72) Inventors: Manfredi Signorino, Wackersdorf (DE); Martin Brabec, Nabburg (DE)

(*) Notice: Subject to any disclaimer, the term of this patent is extended or adjusted under 35 U.S.C. 154(b) by 0 days.

(21) Appl. No.: 16/409,961

(22) Filed: May 13, 2019

(51) Int. Cl.
  *G02B 6/00* (2006.01)
  *F24C 15/00* (2006.01)
  *F21V 8/00* (2006.01)

(52) U.S. Cl.
  CPC ............ *F24C 15/008* (2013.01); *G02B 6/005* (2013.01)

(58) Field of Classification Search
  CPC .............................. F24C 15/008; G02B 6/005
  See application file for complete search history.

(56) References Cited

U.S. PATENT DOCUMENTS

| 2011/0049120 A1 | 3/2011 | Reinhard-Herrscher et al. |
| 2013/0081610 A1* | 4/2013 | Eichelberger ......... F24C 15/008 126/273 R |

* cited by examiner

Primary Examiner — Anne M Hines
(74) Attorney, Agent, or Firm — Sarita L. Pickett; Robert R. Deleault

(57) ABSTRACT

A luminaire for a domestic electric appliance has a light source, a light-guiding body for guiding light emitted by the light source, and a light-permeable window element having a light inlet surface, at which light delivered by the light-guiding body is incident on the window element, and a light outlet surface, at which incident light emerges from the window element after passing through the window element. The light inlet surface has a shape curved in the manner of an arc, which differs from a plane surface.

15 Claims, 4 Drawing Sheets

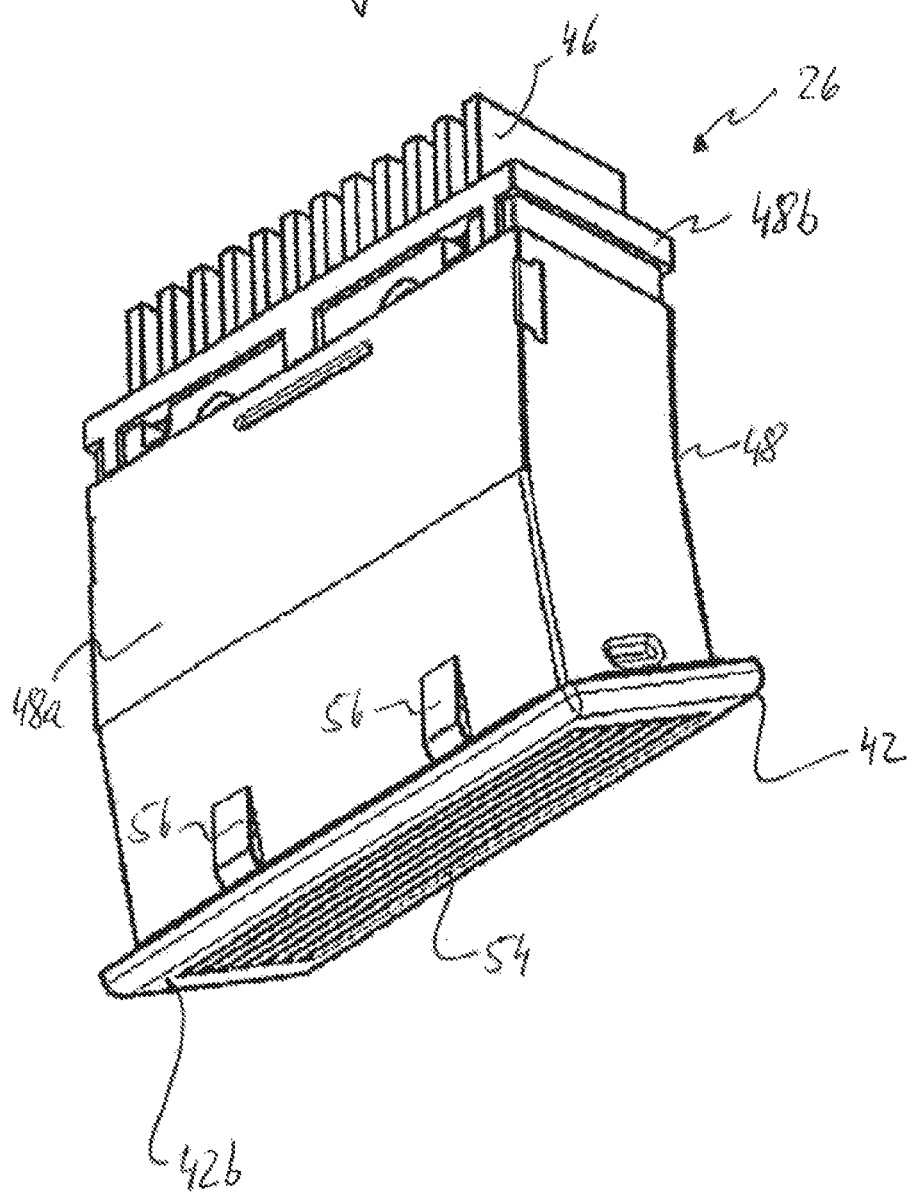

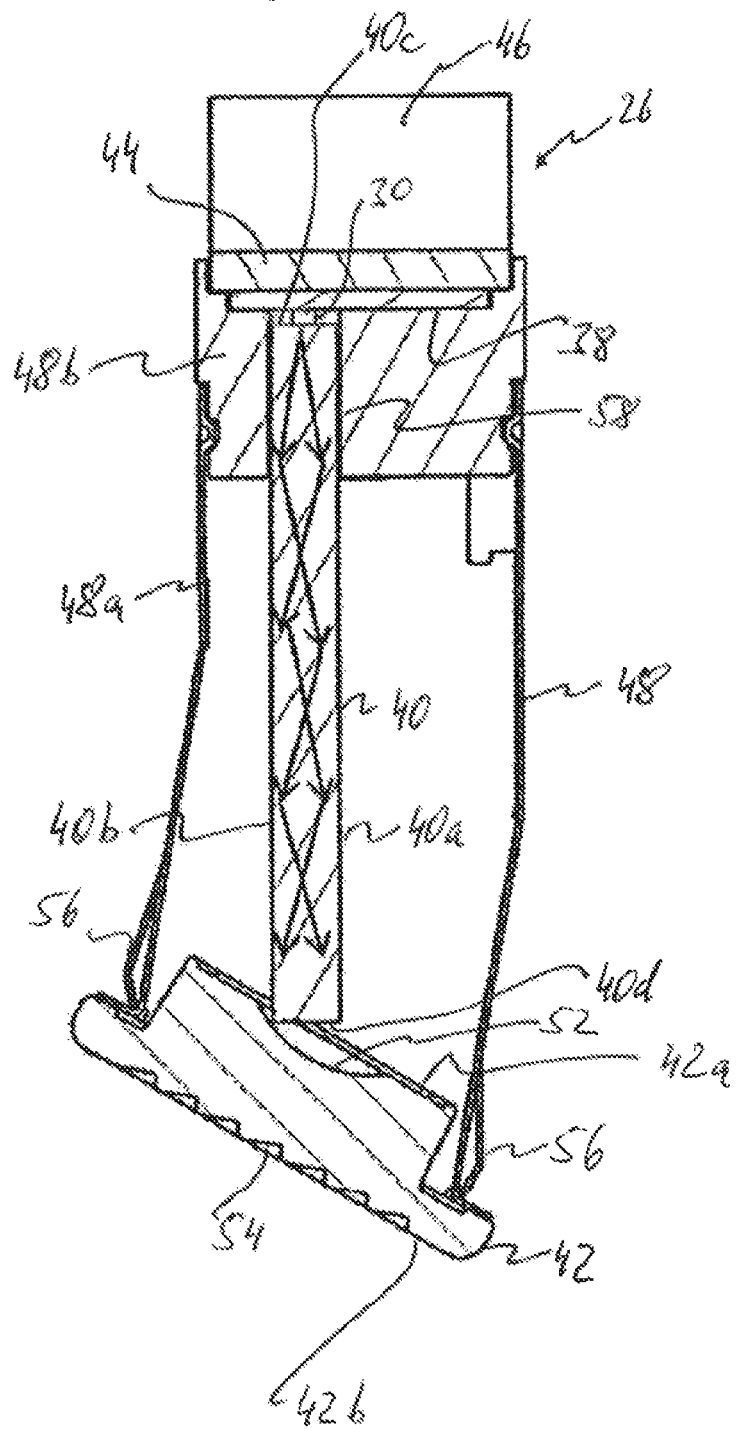

LUMINAIRE FOR DOMESTIC ELECTRIC APPLIANCE, SUCH AS A DOMESTIC OVEN

FIELD OF THE INVENTION

The present invention relates to a luminaire for a domestic electric appliance. In particular, the present invention relates to specific aspects of a window element of a luminaire which is to be fitted into a domestic electric appliance in order to achieve directed illumination of desired regions of an interior of the domestic appliance.

TECHNICAL BACKGROUND

Conventional ovens for domestic use have an oven muffle which possesses an interior which serves as the cooking chamber and can be closed by a door. The muffle is delimited by muffle walls. At one or more points, the muffle walls have an opening into which there is inserted a luminaire which serves to illuminate the cooking chamber. In the case of self-cleaning baking ovens (also referred to as pyrolysis ovens), temperatures of up to 500° C. or above can occur in the cooking chamber during self-cleaning operation. It is therefore desirable in the case of conventional pyrolysis ovens to place the most heat-sensitive components of the luminaire, especially a light source, at as great a distance as possible from the muffle walls. In order to bridge the distance between the light source and the muffle, conventional luminaires use a light-guiding body which serves to guide the light from the light source to a window element of the luminaire, through which the light generated by the luminaire emerges into the muffle interior. In US 2011/0049120 A1, for example, there is described a solution in which the interior of an oven can be illuminated by a plurality of individual luminaires, each of which has a light-guiding rod which bridges the gap between the oven muffle and an outer housing of the oven. At the end of the light-guiding rod that is remote from the muffle there is a light-emitting element, while at the end of the rod close to the muffle there is provided a lens which is inserted into an opening in the muffle wall in question.

SUMMARY OF THE INVENTION

It is an object of embodiments of the present invention to provide a luminaire with a high light output for a domestic electric appliance.

A further object of embodiments of the present invention is to provide a luminaire for a domestic electric appliance which offers good thermal decoupling of a light-generating element of the luminaire from a window element of the luminaire.

A further object of embodiments of the present invention is to provide a domestic oven which has a luminaire with a high light output and with good thermal decoupling between a light-generating element of the luminaire and a window element of the luminaire.

According to specific embodiments, the present invention provides a luminaire for a domestic electric appliance, comprising: a light source; a light-guiding body for guiding light emitted by the light source; a light-permeable window element having a light inlet surface, at which light delivered by the light-guiding body is incident on the window element, and a light outlet surface, at which incident light emerges from the window element after passing through the window element, wherein the light inlet surface has a shape curved in the manner of an arc, which differs from a plane surface.

In specific embodiments, the light inlet surface has a shape curved in the manner of a circular arc in at least one cross-section.

In specific embodiments, the light inlet surface has a linear shape in a first cross-section, while in a second cross-section perpendicular to the first cross-section it has a shape curved in the manner of an arc.

In specific embodiments, the window element is formed by a plate element having opposing plate main sides, wherein the light inlet surface is formed by a depression in a first of the plate main sides. The depression is in the form of, for example, a channel-like depression. In specific embodiments, the light-guiding body projects into the depression. In specific embodiments, the window element is designed with a prism structure on a second of the plate main sides.

In specific embodiments, the light-guiding body is in the form of a flat plate body which guides light emitted by the light source from a first plate narrow side to an opposite second plate narrow side of the light-guiding plate. The plate body can be a solid plate which is made from a transparent, that is to say light-guiding, material and effects light guiding within the material of the plate body by the effect of total reflection. Alternatively, it is conceivable to configure the plate body as a hollow body, of which the inner wall surfaces delimiting the cavity are mirror-reflecting.

In specific embodiments, the luminaire comprises a plurality of light source elements which are arranged in a row one behind the other along the first plate narrow side.

In specific embodiments, the window element is formed by a plate element which is oriented inclined at an angle to the plate-like light-guiding body. The angle of inclination of the window element relative to the light-guiding body can be, for example, in a range between approximately 20 degrees and approximately 60 degrees.

A luminaire according to the invention can be used, for example, to illuminate the muffle interior (cooking chamber) of a domestic baking oven. Alternatively, it is possible to fit a luminaire according to the invention, for example, in an extraction hood arranged overhead. A further possible field of use of a luminaire according to the invention is a domestic microwave oven.

According to a further aspect, specific embodiments of the present invention provide a domestic oven which comprises: a muffle having an upper muffle wall and a wall opening in the upper muffle wall; a door for closing the muffle; and a luminaire for illuminating the interior of the muffle. In these embodiments, the luminaire comprises: a light source; a light-guiding body for guiding light emitted by the light source; and a light-permeable window element inserted into the wall opening and having a light inlet surface, at which light delivered by the light-guiding body is incident on the window element, and a light outlet surface, at which incident light emerges from the window element after passing through the window element, wherein the light inlet surface has a shape curved in the manner of an arc, which differs from a plane surface.

In specific embodiments, the upper muffle wall has a wall main portion lying in a horizontal plane and a wall sub-portion arranged in front of the wall main portion in the direction towards the door, which wall sub-portion extends in the manner of a strip along a front, horizontal upper edge of the oven and is oriented inclined at an angle to a horizontal plane. In these embodiments, the wall opening is formed in the wall sub-portion.

In specific embodiments, the window element is formed by a plate element which is oriented with its plate plane substantially parallel to the wall sub-portion.

In specific embodiments, the light-guiding body comprises a light-guiding plate which is oriented with its plate plane substantially perpendicular to the wall main portion.

In specific embodiments, the light source comprises a plurality of light source elements which are arranged in a row one behind the other along a first plate narrow side of the light-guiding plate which is situated vertically at a higher level, wherein the light-guiding plate guides light emitted by the light source elements from the first plate narrow side to a second plate narrow side, situated vertically at a lower level, of the light-guiding plate, wherein the row of light source elements runs horizontally along a front upper edge of the oven.

According to yet a further aspect of the present invention, specific embodiments provide a domestic oven which comprises: a muffle having an upper muffle wall and a wall opening in the upper muffle wall; a door for closing the muffle; and a luminaire for illuminating the interior of the muffle. The luminaire comprises: a light source; a light-guiding body for guiding light emitted by the light source; and a light-permeable window element inserted into the wall opening and having a light inlet surface, at which light delivered by the light-guiding body is incident on the window element, and a light outlet surface, at which incident light emerges from the window element after passing through the window element, wherein the upper muffle wall has a wall main portion lying in a horizontal plane and a wall sub-portion which is arranged in front of the wall main portion in the direction towards the door, extends in the manner of a strip along a front, horizontal upper edge of the oven and is oriented inclined at an angle to a horizontal plane, wherein the wall opening is formed in the wall sub-portion.

BRIEF DESCRIPTION OF THE DRAWINGS

Preferred embodiments of the present invention will be explained in greater detail hereinbelow with reference to the accompanying drawings, which are given merely by way of illustration and are not to be interpreted as being limiting, in which:

FIG. 3 is a perspective view of a cooking chamber luminaire provided in the exemplary embodiment of FIG. 2, and FIG. 4 is a sectional view of the cooking chamber luminaire of FIG. 3.

DETAILED DESCRIPTION OF PREFERRED EMBODIMENTS

Figure 1:
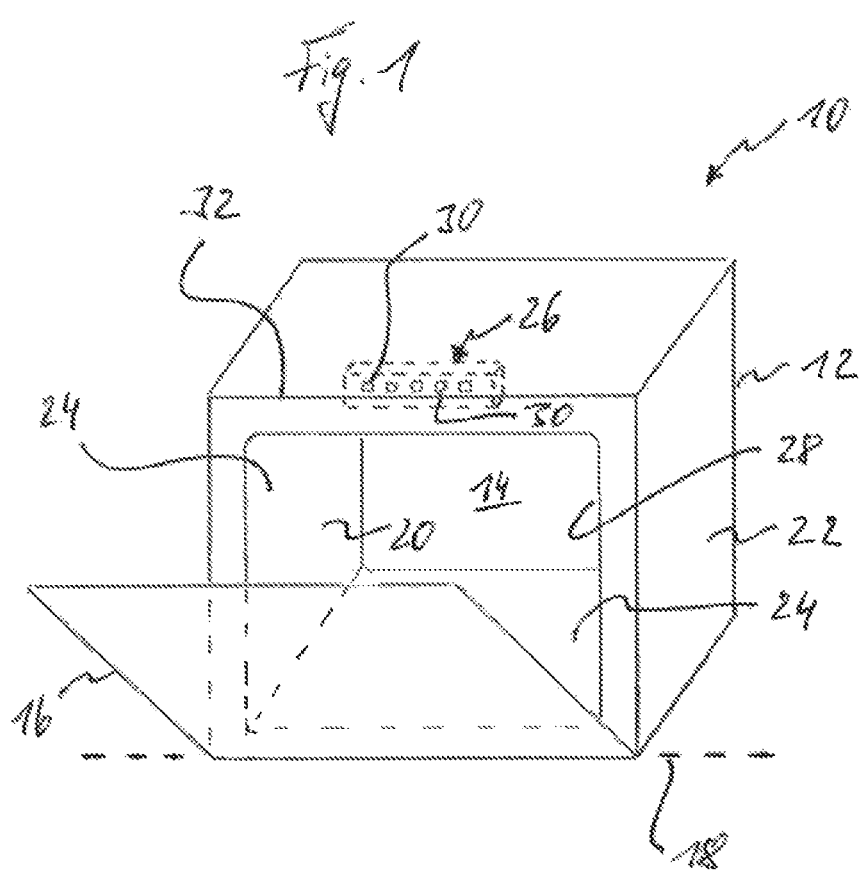
FIG. 1 shows, schematically, a domestic oven according to an exemplary embodiment.

Reference will first be made to FIG. 1. The domestic oven shown therein is designated generally 10. It can be in the form of a self-cleaning domestic baking oven or alternatively in the form of a microwave oven. The oven 10 comprises a main oven body 12, in which a cooking chamber 14 is formed, and a door 16 for closing the cooking chamber 14. In the example shown, the door 16 is mounted on the main oven body 12 to be pivotable about a horizontal pivot axis 18. In the example shown, the main oven body 12 comprises an inner housing 20 delimiting the cooking chamber 14, and an outer housing 22 surrounding the inner housing 20 and determining the outer shape of the main oven body 12. The inner housing 20 can also be referred to as a muffle. The muffle 20, which generally follows the contour of a cuboid, is formed by muffle walls 24 which comprise a lower muffle wall, a rear muffle wall, an upper muffle wall and lateral muffle walls. A luminaire which serves to illuminate the cooking chamber 14 can be fitted into one or more of the muffle walls 24. A cooking chamber luminaire configured in accordance with the principles of the invention is indicated schematically at 26 in FIG. 1. The cooking chamber luminaire 26 is fitted into the oven 10 in the region of an upper muffle wall, that is to say a muffle wall (without a reference numeral in FIG. 1) that delimits the cooking chamber 14 at the top. As can be seen in FIG. 1, it is fitted into the main oven body 12 close to the door 16, that is to say, when viewed in the horizontal direction from the front to the rear, close to an access opening 28 through which the cooking chamber 14 is accessible to a user and which can be closed by the door 16. The fitted position of the luminaire 26 offset towards the front in the direction towards the door 16 allows food in the cooking chamber 14 that is to be cooked to be illuminated obliquely from the front and the top, which ensures that the food to be cooked is clearly visible to the user. In the horizontal direction from side to side, the cooking chamber luminaire 26 is fitted approximately centrally into the oven 10.

The cooking chamber luminaire 26 comprises a plurality of discrete light source elements 30 which are arranged in a row one behind the other, for example with equal mutual spacing. The light source elements 30 are, for example, light-emitting diodes. At least some of the light source elements 30 are designed to emit white light. In specific embodiments, all the light source elements 30 of the cooking chamber luminaire 26 are in the form of white-light generators. In the schematic representation of FIG. 1, a total of five light source elements 30 are shown; it will be appreciated that the total number of light source elements 30 arranged in a row can be chosen as desired, in particular in dependence on the requirements of the brightness to be generated in the cooking chamber 14 and in dependence on the existing space conditions and thus the possible overall size of the cooking chamber luminaire 26. The invention can in principle also be implemented in the case of a form of the cooking chamber luminaire 26 with a single light source element 30; it is, however, also possible for more than the five light source elements 30 shown to be present.

The row of light source elements 30 extends horizontally, in a direction from left to right, that is to say from side to side, of the main oven body 12, or in other words parallel to a horizontal front upper edge 32 of the main oven body 12.

Reference will now be made to the exemplary embodiment of FIGS. 2 to 4. Elements which are the same or have the same effect are provided with the same reference numerals in these figures as in FIG. 1.

Figure 2:
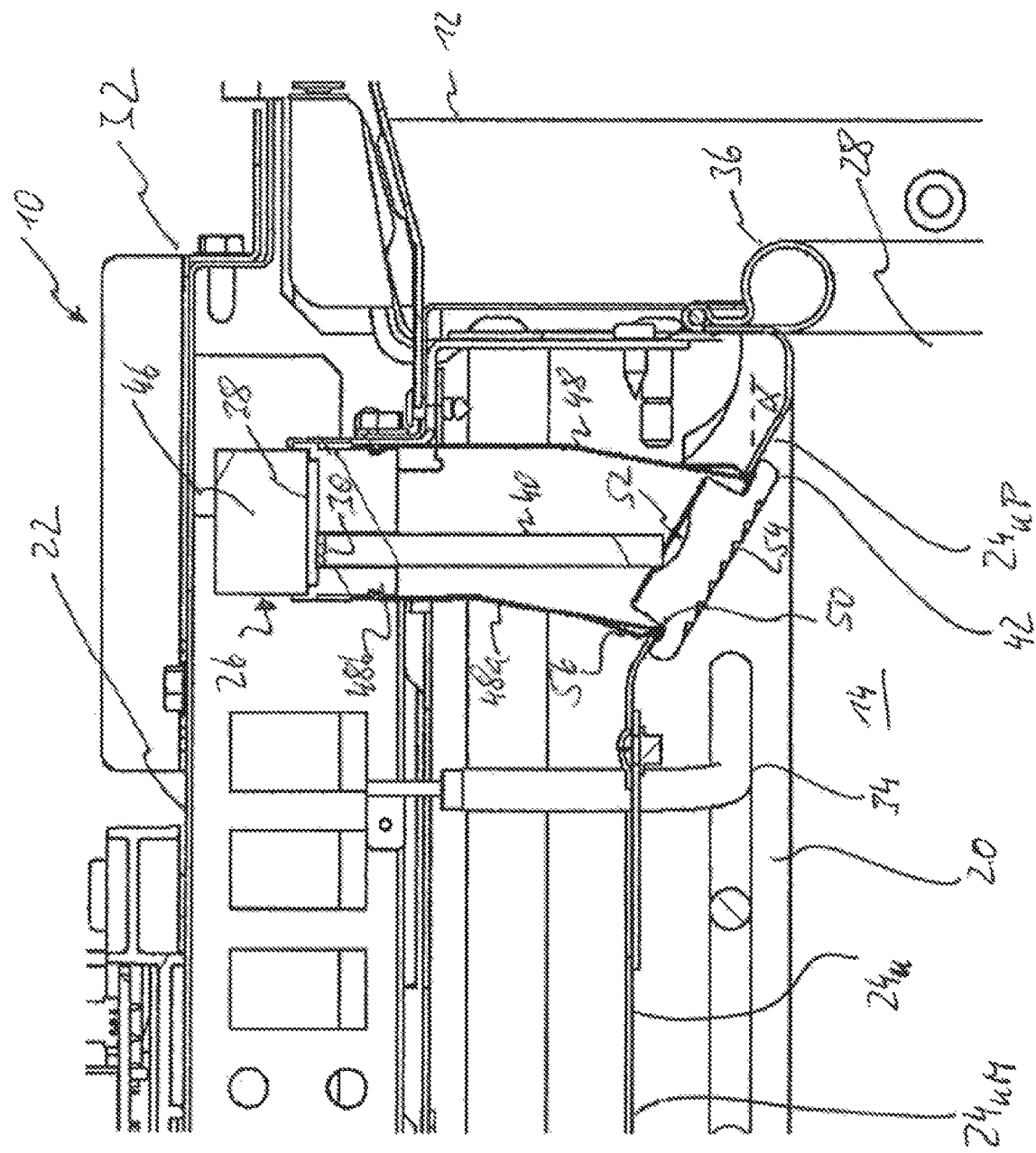
FIG. 2 is a sectional view of a muffle front region, close to the door, of a domestic muffle oven according to an exemplary embodiment.

The sectional view of FIG. 2 corresponds to a vertical section of the oven 10 of FIG. 1 in a vertical plane orthogonal to the longitudinal extent of the housing edge 32, at a point at which the luminaire 26 is situated. It will be seen in FIG. 2 that the oven muffle 20 comprises an upper muffle wall $24_u$ which delimits the cooking chamber 14 at the top and has a wall main portion $24_{uM}$, which lies in a horizontal plane in the correct use position of the oven 10, and a wall sub-portion $24_{uP}$. The wall main portion $24_{uM}$ occupies the majority of the surface of the upper muffle wall $24_u$. The wall sub-portion $24_{uP}$ adjoins the wall main portion $24_{uM}$ at the front (when seen from the position of a user standing in front of the door 16) and is inclined at an angle relative to a horizontal plane. The angle of inclination of the wall sub-portion $24_{uP}$, designated α in FIG. 2, is, for example, in a range between 20 and 60 degrees. The wall sub-portion $24_{uP}$ extends along the housing edge 32 in the manner of an elongate strip substantially over the entire width of the muffle 20.

Also visible in FIG. 2 are an electric heating coil 34 for providing a grilling function of the oven 10, and a door seal 36 extending round the access opening 28 and attached to the main oven body 12.

The luminaire 26 comprises a printed circuit board 38, on which the row of light source elements 30 is mounted, a flat light-guiding plate 40 having a substantially rectangular or square contour, a light-permeable window element 42 from which light generated by the luminaire 26 emerges into the cooking chamber 14, a cooling body 44 having a plurality of cooling ribs 46, and a luminaire housing 48, which in the example shown is in multipart form. The printed circuit board 38 is, for example, a so-called aluminium printed circuit board, which contains a layer of aluminium for improving the heat dissipation. The cooling body 44 is fastened to the rear side of the printed circuit board 38, for example by means of a heat-conducting adhesive. The light source elements 30 are mounted on the front side of the printed circuit is board 38. The row of light source elements 30 extends in each of FIGS. 2 and 4 perpendicular to the plane of the drawing.

The light-guiding plate 40 is a solid body in which light emitted by the light source elements 30 is guided, by total reflection at the opposing plate main sides (designated 40a and 40b in FIG. 4), from a first plate narrow side 40c to an opposite, second plate narrow side 40d (again see FIG. 4). The light-guiding plate 40 is oriented with its plate plane substantially vertical, that is to say perpendicular to the wall main portion $24_{uM}$. It is so oriented that its plate narrow sides 40c and 40d extend along the row of light source elements 30 and thus parallel to the front upper edge 32 of the main oven body 12. Light emitted by the light source elements 30 is coupled into the light-guiding plate 40 at the plate narrow side 40c. After passing through the light-guiding plate 40, the light coupled in leaves the light-guiding plate 40 at the plate narrow side 40d. Examples of paths of light beams in the light-guiding plate 40 are illustrated in FIG. 4 by arrows.

The window element 42 is in the form of a plate element (pane element) with a quadrangular contour and has opposing plate main sides 42a, 42b. The plate main side 42a faces away from the muffle interior of the oven 10, while the plate main side 40b faces towards the muffle interior. The luminaire 26, and specifically the window element 42, is inserted into a wall opening 50 of approximately quadrangular shape which is formed in the wall sub-portion $24_{uP}$. In its fitted position, the window element 42 is oriented substantially parallel to the plane of the wall sub-portion $24_{uP}$, that is to say the plate main sides 42a, 42b of the window element 42 are oriented inclined at an angle to a horizontal plane. This fitted position of the window element 42 means that the window element 42 is oriented inclined at an angle to the vertical light-guiding plate 40.

On its plate main side 42a, the window element 42 is designed with a channel-like elongate depression 42, which in the sectional view of FIGS. 2 and 4 has a shape curved in the manner of a circular arc. The light-guiding plate 40 projects with its plate narrow side 40d at least in part into the depression 52. The depression 52 forms a light inlet surface at which light that emerges from the light-guiding plate 40 at the plate narrow side 40d enters the window element 42. Owing to its arcuate curve, the depression 52 has a light-collecting effect for the light entering the window element 42 in the depression 52.

On its plate main side 42b facing towards the muffle interior, the window element 42 is designed with a prism structure 54, which in the example shown is formed by an arrangement of linear prisms extending parallel to one another. The prism structure 54 forms a light outlet surface at which the light collected by means of the depression 52 emerges from the window element 42 into the cooking chamber 14, and ensures that light is guided to the middle and rear regions of the cooking chamber 14 (as seen by an observer standing in front of the oven 10). The form of the window element 42 with the light-collecting depression 52 and the prism structure 54 ensures that, despite the fitted position of the luminaire 26 close to the door, food in the cooking chamber 14 that is to he cooked can be properly illuminated.

The light-guiding plate 40 is made of borosilicate glass, for example. Alternatively, it can be made of a plastics material that is sufficiently transparent for the light of the light source elements 30.

In the exemplary embodiment of FIGS. 2 to 4, the luminaire housing 48 comprises a main housing 48a which is hollow on the inside, in which a large part of the light-guiding plate 40 extends and to which the window element 42 is fixed. The main housing 48a is made, for example, of a metal material, for example steel, and in the exemplary embodiment shown has an arrangement of clamping tongues 56 by means of which the luminaire 26 can be fixed in the wall opening 50 of the muffle wall $24_u$ by a snap-fit locking connection. The luminaire housing 48 additionally comprises a housing part 48b which serves as the carrier for the printed circuit board 38 and is connected in an end region remote from the muffle to the main housing 48a by being fitted thereto. The housing part 48b effects thermal decoupling of the printed circuit board 38 and the electrical or/and electronic components mounted thereon from the main housing 48a, which has comparatively high thermal conductivity. The housing part 48b is made, for example, of a plastics material and has poor thermal conductivity compared with the main housing 48a. In the example shown, the housing part 48b is in the form of a block-shaped body and has an insertion slot 58 into which the light-guiding plate 40 is inserted for correct positioning thereof.

The invention claimed is:

1. A luminaire for a domestic electric appliance, comprising:
 a light source;
 a light-guiding body for guiding light emitted by the light source; and
 a light-permeable window element having a light inlet surface, at which light delivered by the light-guiding body is incident on the window element, and a light outlet surface, at which incident light emerges from the light-permeable window element after passing through the light-permeable window element, wherein the light inlet surface has a shape curved in the manner of an arc, which differs from a plane surface;
 wherein the light-guiding body is in the form of a flat plate body which guides light emitted by the light source from a first plate narrow side to an opposite second plate narrow side of the light-guiding plate.

2. The luminaire according to claim 1, wherein the light inlet surface has a shape curved in the manner of a circular arc in at least one cross-section.

3. The luminaire according to claim 1, wherein the light inlet surface has a linear shape in a first cross-section and, in a second cross-section perpendicular to the first cross-section, the light inlet surface has a shape curved in the manner of an arc.

4. The luminaire according to claim 1, wherein the window element is formed by a plate element having opposing plate main sides, and the light inlet surface is formed by a depression in a first of the plate main sides.

5. The luminaire according to claim 4, wherein the depression is in the form of a channel-like depression.

6. The luminaire according to claim 4, wherein the light-guiding body projects into the depression.

7. The luminaire according to claim 4, wherein the window element is designed with a prism structure on a second of the plate main sides.

8. The luminaire according to claim 1, wherein the flat plate body is a solid plate.

9. The luminaire according to claim 1, comprising a plurality of light source elements which are arranged in a row one behind the other along the first plate narrow side.

10. The luminaire according to claim 1, wherein the light-permeable window element is formed by a plate element which is oriented inclined at an angle to the light-guiding body.

11. The luminaire according to claim 10, wherein the light-permeable window element is inclined at an angle of between approximately 20 degrees and approximately 60 degrees relative to the light-guiding body.

12. A domestic oven, comprising:
a muffle having an upper muffle wall and a wall opening in the upper muffle wall;
a door for closing the muffle; and
a luminaire for illuminating an interior of the muffle, wherein the luminaire comprising comprises:
a light source;
a light-guiding body for guiding light emitted by the light source; and
a light-permeable window element inserted into the wall opening and having a light inlet surface, at which light delivered by the light-guiding body is incident on the light-permeable window element, and a light outlet surface, at which incident light emerges from the light-permeable window element after passing through the light-permeable window element;
wherein the upper muffle wall has a wall main portion lying in a horizontal plane and a wall sub-portion which is arranged in front of the wall main portion in the direction towards the door, extends in the manner of a strip along a front upper edge of the oven and is oriented inclined at an angle to a horizontal plane; and
wherein the wall opening is formed in the wall sub-portion.

13. The domestic oven according to claim 12, wherein the light-permeable window element is formed by a plate element which is oriented with a plate plane substantially parallel to the wall sub-portion, and wherein the light-guiding body comprises a light-guiding plate which is oriented with a plate plane substantially perpendicular to the wall main portion.

14. The domestic oven according to claim 13, wherein the light source comprises a plurality of light source elements which are arranged in a row one behind the other along a first plate narrow side of the light-guiding plate which is arranged vertically at a higher level, wherein the light-guiding plate guides light emitted by the plurality of light source elements from the first plate narrow side to a second plate narrow side, situated vertically at a lower level, of the light-guiding plate, wherein the plurality of light source elements extends horizontally along a front upper edge of the oven.

15. A luminaire for a domestic electric appliance, comprising:
a light source;
a light-guiding body for guiding light emitted by the light source; and
a light-permeable window element having a light inlet surface, at which light delivered by the light-guiding body is incident on the window element, and a light outlet surface, at which incident light emerges from the light-permeable window element after passing through the light-permeable window element;
wherein the window element is formed by a plate element having opposing plate main sides;
wherein a channel-like elongate depression is formed in a first of the plate main sides and the light inlet surface of the light-permeable window element is formed within the depression; and
wherein the light-guiding body extends into the depression.

* * * * *